US005250813A

United States Patent [19]

Takahashi et al.

[11] Patent Number: 5,250,813

[45] Date of Patent: Oct. 5, 1993

[54] PRINT PAPER DETECTING CIRCUITS WITH GAIN REDUCTION

[75] Inventors: Yoshinori Takahashi; Toshikazu Ito, both of Tokyo, Japan

[73] Assignee: Oki Electric Industry Co., Ltd., Tokyo, Japan

[21] Appl. No.: 967,057

[22] Filed: Oct. 28, 1992

[30] Foreign Application Priority Data

Oct. 29, 1991 [JP] Japan .................................. 3-311760

[51] Int. Cl.$^5$ ........................ H01J 40/14; G01N 21/86

[52] U.S. Cl. .................................. 250/561; 250/214 B

[58] Field of Search ..................... 250/561, 214 B, 559, 250/221, 222.1, 223 R, 214 AG; 340/555–557; 356/429–430, 433–435

[56] References Cited

U.S. PATENT DOCUMENTS

| | | | |
|---|---|---|---|
| 4,372,672 | 2/1983 | Pries | 250/559 |
| 4,737,649 | 4/1988 | Naruse | 356/430 |
| 4,778,296 | 10/1988 | Takahashi . | |
| 4,851,689 | 7/1989 | Hasegawa | 250/214 B |
| 4,983,854 | 1/1991 | Mizuno et al. | 250/561 |
| 5,008,532 | 4/1991 | Ono et al. | 250/222.1 |
| 5,084,627 | 1/1992 | Ueki et al. | 250/561 |
| 5,117,119 | 5/1992 | Schubert et al. | 250/559 |

FOREIGN PATENT DOCUMENTS

| | | |
|---|---|---|
| 65563/80 | 6/1981 | Australia . |
| 60-191966 | 9/1985 | Japan . |

OTHER PUBLICATIONS

J. C. McKenney et al, "Printer Paper Top of Form and End of Form Sensor", *IBM Technical Disclosure Bulletin,* vol. 27, No. 28, Sep. 1984, pp. 2535–2538.

"Mechanism on a Serial Printer", *IBM Technical Bulletin,* vol. 30, No. 4, Sep. 1987, pp. 1894–1895.

*Primary Examiner*—David C. Nelms
*Assistant Examiner*—Michael Messinger
*Attorney, Agent, or Firm*—Spencer, Frank & Schneider

[57] ABSTRACT

A print paper detecting circuit for installation on a printer, to detect whether a print paper is supplied at a predetermined position along a paper path by using an optical sensor composed of a light emitting diode and phototransistor. The circuit detects the existence of the print paper according to the detection of light which is emitted from the light emitting diode, which is reflected from the print paper, and which arrives at the phototransistor. According to one embodiment, circuit has a current amplifier and a gain reducing circuit. The current amplifier feeds a pulse current which is greater than the normal constant current to the light emitting diode while the gain reducing circuit reduces the output of the output voltage. From the phototransistor during the time that the pulse current is supplied with this circuit arrangement any external light entering the printer does not affect the detection of the presence of the printer paper since the quantity of the light from the light emitting diode is greater than the quantity of the external light.

12 Claims, 11 Drawing Sheets

PRINT PAPER DETECTING CIRCUITS WITH GAIN REDUCTION

REFERENCE TO RELATED APPLICATIONS

This application claims the priority of Japanese application Ser. No. JP 311760/1991 filed Oct. 29, 1991, which is incorporated herein by reference.

BACKGROUND OF THE INVENTION

1. Field of the Invention

The present invention relates to a print paper detecting circuit installed on a printer, and more particularly to a print paper detecting circuit which detects whether a sheet of print paper is supplied at the printing position using an optical sensor.

2. Description of the Related art

A printer prints on various types of print paper supplied from various paper feed paths, such as a cut sheet of print paper which is manually supplied via a paper insertion path or is automatically supplied from a cut sheet feeder (CSF), or a continuous print paper which is supplied from a pin tractor mechanism. The printer detects whether the paper is supplied at the printing location and controls a paper alarm LED to emit a alarm signal and stops the printing operation when the paper is not supplied at the printing position. It is well-known that an optical sensor, such as a photoreflector, may be used to detect the paper.

FIG. 14 shows a sectional side elevation of the general structure of the printer.

In FIG. 14, the cut sheet of print paper 41 is inserted on a guide 42 by hand or is supplied from a cut sheet feeder (CSF) (not shown), and is fed between a platen 43 and a feed roller 44. A photoreflector 45 is mounted on the side of the guide 42 opposite that which the platen 43 is mounted and adjacent an opening 42*a* in the guide 42 so that light emitted by the photoreflector 45 will strike either the platen 43 or a sheet of paper 41, if present adjacent the opening 42*a*. The cut sheet of print paper 41 is inserted between the platen 43 and the feed roller 44 and is fed along a guide 46 between the platen 43 and a printing head 47 due to rotation of the platen 43. After printing on the cut sheet of paper 41 by the printing head 47, the paper 41 is inserted between the platen 43 and a bail roller 48 and is fed to a output opening 49.

A paper alarm LED 50 is installed o the front of the printer.

A paper separator 51 is provided to permit an already printed sheet 41 being fed out of the printer from accidently again entering the paper feed path.

The paper separator 51 and a rear cover 52 are removable so that a cut sheet feeder (CSF) can be installed on the printer if desired.

FIG. 15 shows the print paper detecting circuit having a photoreflector 45 as shown in FIG. 14.

In FIG. 15, a light emitting diode PHD of the photoreflector 45 is serially connected to a current limiting resistance R1 which determines the current intensity of the light emitting diode PHD. Supply or source voltage +E is supplied to one end of the series connection of the resistance R1 and the light emitting diode PHD while the other end is connected to ground, i.e., the other terminal of the voltage source. The emitter of a phototransistor PHTR of the photoreflector 45 is grounded and the collector of the phototransistor PHTR is connected to one end of a load resistance R2 whose other end is connected to the source supply voltage +E. The output voltage Vo at the collector of transistor PHTR is changed to a logical level by an input buffer BUF which provides an output to a common controller (not shown) as a print paper detecting signal.

In the print paper detecting circuit, if the output current of the phototransistor PHTR is Io and the input current of the input buffer BUF can be ignored, the output voltage (Vo) of the phototransistor PHTR is given by following equation (1):

$$Vo=E-R2\times Io \qquad (1)$$

When the print paper is not supplied, most of light emitted from the light emitting diode PHD is absorbed by the platen 43 and only a small amount of light reaches the phototransistor PHTR. At this time, if the output current is Iob and output voltage (Vo) is Voh, the output voltage (Voh) is defined by the following equation (2):

$$Voh=E-R2\times Iob \qquad (2)$$

When the sheet of print paper is supplied, most of light emitted from the light emitting diode PHD is reflected from the surface of the paper and arrives at the phototransistor PHTR. At this time, if the output current is Iow and output voltage is Vol, the output voltage (Vol) is given by the following equation (3):

$$Vol=E-R2\times Iow \qquad (3)$$

The relationship between the output current (Iob) and output current (Iow) is Iob <Iow on the basis of the difference in reflectance between the print paper sheet 41 and the platen 43. Moreover, supply voltage (+E) and the load resistance is preset so that the relationship between the threshold voltage Vth of the input buffer BUF and the output voltage is Voh>Vth>Vol. Therefore, the output voltage from the optical sensor is changed to a logical level by the input buffer BUF and a output signal from the input buffer BUF is either a "0" level when the paper is supplied, or a "1" level when the paper is not supplied. This output signal is sent to the common controller for the printer as the print paper detecting signal. The common controller monitors the print paper detecting signal, detects whether the print paper is supplied at a predetermined position and controls the paper alarm LED, the printing operation and the paper end monitor according to the detected result.

FIG. 16 is a sectional side elevation showing the general structure of the printer of FIG. 14 but with a cut sheet feeder (CSF). The cut sheet feeder (CSF) comprises a hopper 53 for holding the paper sheet, a pick-up roller 55 for feeding a sheet of paper which is in the hopper 53, a frame 54, a spring 56 for pushing the hopper 53 and the paper thereon toward the pick-up roller 55, a stacker 58 for stacking printed paper sheets, and an output roller 59 for feeding the printed paper sheets to the stacker 58.

The pick-up roller 55 has a gear which is selectively engaged with the gear of the shaft of the platen 43 by an electromagnetic clutch, now shown. Therefore, when the gear of the pick-up roller 55 is engaged via the clutch, the pickup roller 55 rotates in synchronization with the platen 43, and when the gear is not engaged, the pick-up roller 55 does not rotate eve when the platen 43 rotates.

The spring 56 pushes the paper sheets into engagement with the pick-up roller 55. One paper sheet at a time is fed from the hopper 53 to the platen 43 by the rotation of the pick-up roller 55, since the spring 56 provides a constant pressure between the paper sheets and the pick-up roller 55.

The output roller 59 has a gear which engages the gear of the platen shaft, rotates together with the rotation of the platen, and then feeds the printed paper sheet to the stacker 58.

The print paper detecting circuit described above has the problem that when external light, such as natural light or illuminating light, enters the inside of the printer and arrives at the phototransistor PHTR and when the energy of the external light is equal to or greater than the energy of the light which is emitted from the light emitting diode PHD and which is reflected from the print paper 41, the print paper detecting circuit effects erroneous detection and the common controller effects erroneous operation.

SUMMARY OF THE INVENTION

Accordingly, an object of the present invention is to provide a print paper detecting circuit, including an optical sensor at a predetermined location, which accurately detects whether the print paper is supplied at the predetermined position without erroneously detecting or erroneously operating even when the external light enters the inside of the printer and arrives at the optical sensor.

Another object of the invention is to provide a print paper detecting circuit including an optical sensor which is able to avoid damaging the optical sensor even when the signal for driving the optical sensor is generated for a long period of time because of noise entered into an AC power source for the printer.

A further object of the present invention is to provide a print paper detecting circuit which is able to detect the existence of the print paper without regard to differences in sensitivity of the sensor, differences in the reflectance on the basis of the paper type, and so on.

A further object of the invention is to provide a print paper detecting circuit which is able to control the time for driving the optical sensor and is able to avoid affecting the life time of the optical sensor.

According to the present invention, the print paper detecting circuit comprises:

To achieve the above objects, according to one embodiment of the invention, a print paper detecting circuit for detecting the presence of a print paper at a desired position along a paper feedpath of a printer comprises: an optical sensor disposed at the desired position and having a light emitting diode for emitting light and a phototransistor for receiving the light; and producing a corresponding output voltage; a current supplying circuit for normally supplying a constant current to the light emitting diode; a current amplifying circuit, responsive to a control pulse and connected to the current supply circuit, for supplying a current pulse to amplify the current supplied to the light emitting diode; a gain reducing circuit, responsive to the control pulse, for reducing the gain of the output voltage from the phototransistor to less than a normal steady state gain during the time the current pulse is supplied; and an output circuit, responsive to the output voltage of said phototransistor, for providing an output signal indicating the presence of a print paper at the desired position.

According to modifications of the above circuit, the current amplifying circuit may include a time limit circuit for limiting the maximum length of time the current pulse is supplied to the light emitting diode, the output circuit may include a buffer, which is responsive to the output voltage from the phototransistor, to produce a first logic level output signal when a paper is detected and a second logic lever output signal when no paper is detected, or the output circuit may include an A/D converter for converting the output voltage from the phototransistor to a corresponding digital value which is compared by a printer controller with a predetermined threshold value to determine the presence of the paper.

According to a further embodiment of the invention, a print paper detecting circuit for detecting the presence of a print paper at a desired position along a printer paper feed path comprises: an optical sensor disposed at the desired position and having a light emitting diode for emitting light and a phototransistor for receiving the light and producing an output signal corresponding to the received light; a current supply circuit, including a switch circuit, for supplying a high level of a driving current to the light emitting diode when the switch circuit is actuated; an actuating circuit for selectively actuating the switch circuit for a predetermined duration in response to a control signal; and an output circuit for providing a paper detecting signal according to the output voltage from said phototransistor.

According to features of this latter embodiment, the current supply circuit includes a transistor having its emitter-collector path connected in series with the lightemitting diode and a resistor across a voltage source, and its bas connected to the actuating circuit which preferably is a one shot multivibrator, and the output circuit includes an invertor for inverting the output voltage from the phototransistor, and a set-reset flip-flop circuit having a set input connected to receive an output signal from the invertor, a reset input to receive the control pulse, and an output for providing a signal indicating the detection of a paper sheet by the phototransistor.

According to a still further embodiment of the invention, the print paper detecting circuit for detecting the presence of a print paper at a desired position along a printer paper feedpath comprises: an output sensor disposed at the desired position and having a light emitting diode for emitting light and a phototransistor for receiving the light and producing an output signal corresponding to the received light; a pulse generating circuit for generating driving pulses at a given frequency; a switching circuit, responsive to the driving pulses, for alternatingly driving the light emitting diode in accordance with the given frequency; and an output circuit for discriminating the frequency band of the driving pulses from the output signal of the phototransistor to provide a paper detecting signal.

According to features of this embodiment the predetermined frequency is higher than a commercial frequency used for operation of the printer, the switching circuit comprises a transistor having its emitter-collector path connected in series with a resistor and the light-emitting diode across a voltage source, and having its base connected to the output of the pulse generating circuit, and output circuit includes a high pass filter for passing the frequency band of the driving pulses while blocking the commercial frequency, and an integrator connected to the output of the filter to convert the output from the filter to a direct output.

DESCRIPTION OF THE PREFERRED EMBODIMENTS

Figure 1:
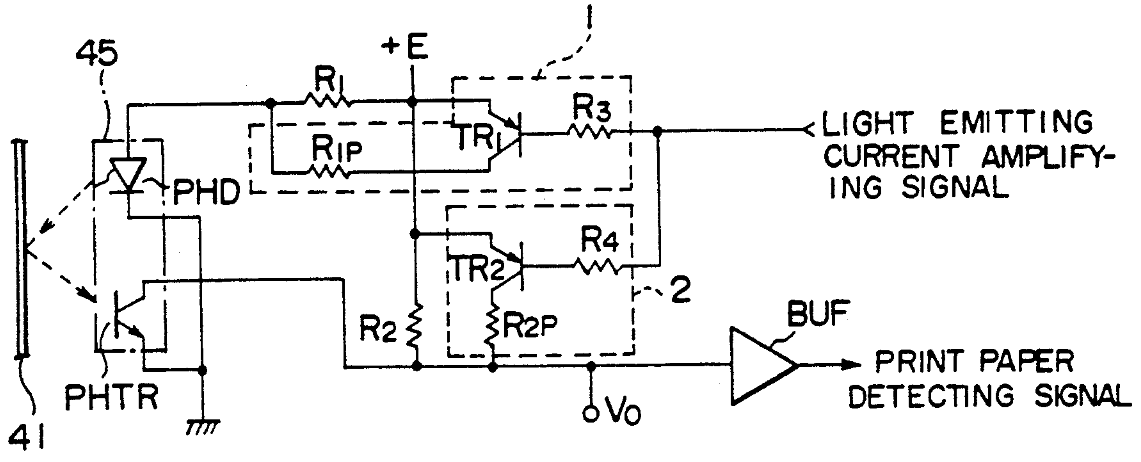
FIG. 1 is a circuit diagram illustrating a first embodiment of a print paper detecting circuit according to the present invention.

FIG. 1 is a circuit diagram illustrating a first embodiment of a print paper detecting circuit according to the present invention in which the same or like parts of the related art described above are denoted by the same reference characters throughout.

In the embodiment as illustrated in FIG. 1, the print paper detecting circuit has a light emitting current amplifier 1 connected between the supply voltage +E and the anode of the light emitting diode PHD and a gain reducing or attenuating circuit 2 connected between the supply voltage +E and the collector of the phototransistor PHTR. The circuit 1 supplies a pulse current greater than the constant current to the light emitting diode PHD and circuit 2 simultaneously reduces the gain of the output voltage of the phototransistor PHTR during the low level of a light emitting current amplifying signal impressed from a common controller 3 which is shown in FIG. 2.

The light emitting current amplifier 1 has a circuit path which is connected in parallel with the current limit resistance R1 and which includes a current limit resistance R1p, which determines the magnitude of the pulse current, connected in series with the emitter-collector path of the transistor TR1, and an input resistance R3 connected to the base of the transistor TR1. The gain reducing circuit 2 has a series circuit of a gain reducing resistance R2p and the emitter-collector path of the transistor TR2 connected in parallel with the load resistance R2, and an input resistance R4 connected to the base of the transistor TR2. The light emitting current amplifying signal or control pulse from the common controller 3 (see FIG. 2) is fed to the respective bases of the transistors TR1 and TR2 via the respective input resistances R3 and R4.

Figure 2:
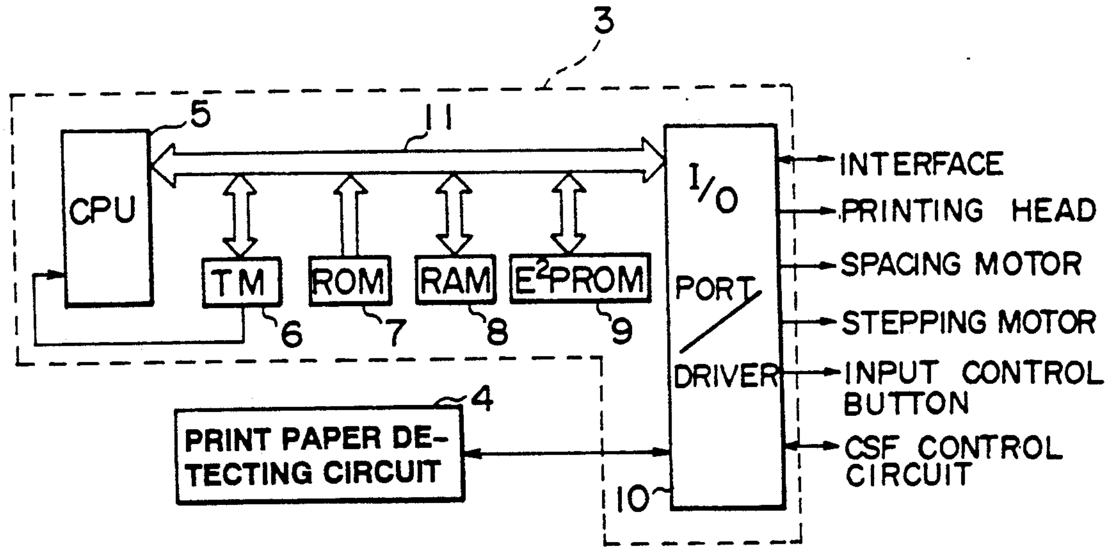
FIG. 2 is a circuit block diagram illustrating a printer controller according to the present invention.

FIG. 2 is a circuit block diagram illustrating a printer controller 3 which is a common controller for controlling the entire operation of the printer and the print paper detecting circuit 4 according to the present invention. The common controller 3 is connected to an interface circuit for connecting the printer to a superior or higher order system such as a personal computer, to the printer head, to a spacing motor for moving the printing head in the printing direction, to a stepping motor for line feed, to input control buttons such as an input keypad, and to a CFS control circuit for controlling a cut sheet feeder, each not shown.

The common controller 3 includes a microprocessor (CPU) 5, a programmable timer (TM) 6 for generating a timing pulse, a read only memory (ROM) 7 for storing the program and the font data, a random access memory (RAM) 8 for temporarily storing the received data from the superior system, a non-volatile memory (EEPROM) for permanently storing mode set data such as paper size and a print font selecting data, an I/O port/driver 10 for controlling input/output of the interface circuit and the print paper detecting circuit 4 according to the instruction from the CPU 5, and a bus line (BUS) 11 for coupling the above components to each other.

In the printer mode for inserting the paper by hand, the operator puts the paper on the guide 42 (FIG. 14) and then turns on a paper path switch on the input key pad. When the CPU 5 detects that a paper path switch is turned on according to the program stored in ROM 7, CPU 5 controls the print paper detecting circuit 4 and detects whether a paper sheet is supplied at the predetermined position. Furthermore, CPU 5, after detecting the presence of the paper sheet, actuates the programmable timer (TM) 6 and actuates the stepping motor to feed the paper to the predetermined printing point.

Figure 14:
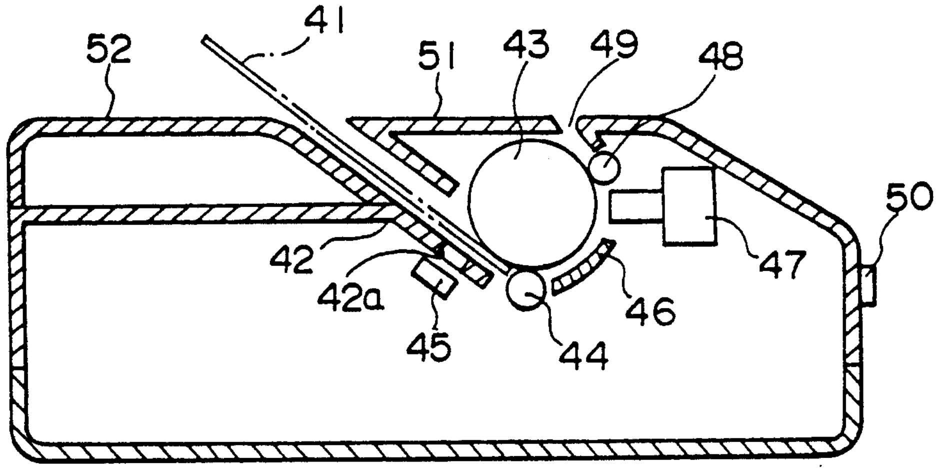
FIG. 14 is a sectional side elevation illustrating the general structure of a printer having a manual paper insertion path.
Figure 15:
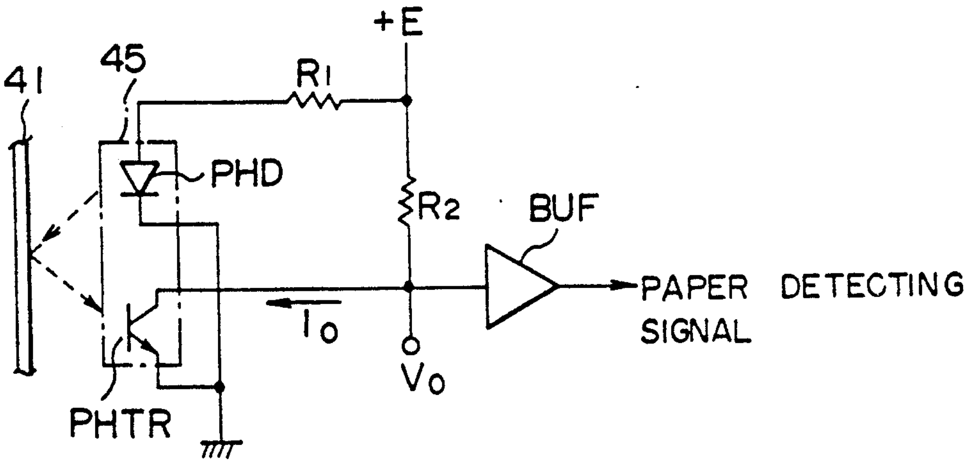
FIG. 15 is a circuit diagram illustrating the general structure of the print paper detecting circuit.

In the mode wherein a cut sheet feeder (CSF) is installed and used for paper supply (FIG. 16) when the CPU 5 receives one line of printing data from the superior system via the interface circuit, CPU 5 effects the print paper feed by the CSF while it receives successive printing data. During this paper feed, CPU 5 controls the actuation of the stepping motor for the line feed. According to the actuation of the stepping motor, the platen 43 (as shown in FIG. 14) rotates, and the paper feed mechanism of the CSF, which is engaged to a gear of the platen shaft, operates to feed the print paper. Furthermore, CPU 5 controls the print paper detecting circuit 4 to detect whether the print paper is supplied at the predetermined position, e.g. at opening *42a* of FIG.

16, and actuates the stepping motor for feeding the paper to the predetermined printing location after detecting the presence of the paper.

Figure 16:
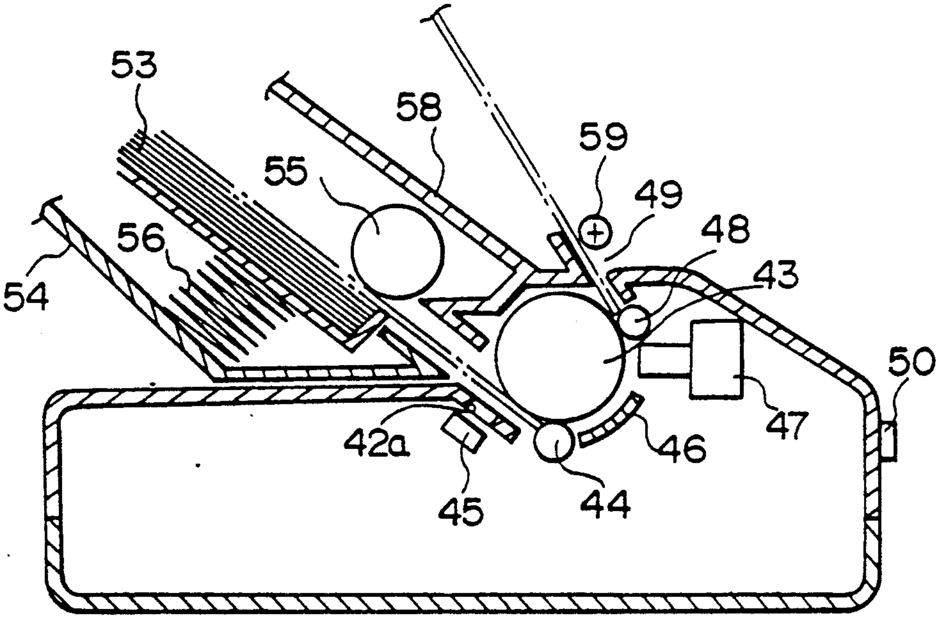
FIG. 16 is a sectional side elevation illustrating the general structure of the printer with an installed cut sheet feeder (CSF).

If CPU 5 does not detect the presence of the paper even though it actuates the stepping motor for a predetermined time, CPU 5 controls circuits to indicate a paper jam by flashing the paper alarm LED (as shown in FIGS. 14 and 16).

The operation of the print paper detecting circuit 4 is explained with reference to the timing diagram shown in FIG. 3.

When the light emitting current amplifying signal or control pulse from the common controller 3 becomes low level for a predetermined period (pulse length Tw), transistor TR1 of the light emitting current amplifier 1 is turned ON and pulse current (Ifp) limited by resistance R1p flows to the light emitting diode PHD of the photoreflector 45. If the forward voltage of the light emitting diode PHD for light emission is Vfp and the ON voltage of transistor TRI can be ignored, the pulse current (Ifp) is given by the following (4):

$$\begin{aligned} Ifp &\approx (E - Vfp)/\{(R1 \times R1p)/(R1 + R1p)\} \\ &\approx (E - Vfp)/R1 \times Kp \approx If \times Kp \end{aligned} \quad (4)$$

That is, the pulse current (Ifp) is more than about $Kp(=(R1+R1p)/R1p)$ times the constant current (If). The light emitting diode PHD emits light about in proportion to the current which flows to the light emitting diode PHD. A portion of the light which is emitted by the light emitting diode PHD and is reflected from the print paper or the platen, and the noise light from the outside, arrive at the phototransistor PHTR, and then an output current (Iop) as given by the following equation (5) flows.

$$Iop = (Kd \times Kr) \times Ifp + In \quad (5)$$

In the above equation (5), $(Kd \times Kr)$ is a transformation coefficient for the output current to the light emit current, that is, Kd is a proportionality coefficient inherent in the optical sensor and Kr is the reflectance of reflector. The output current due to the noise light from outside is In.

Furthermore, the transistor TR2 is turned ON simultaneously with the transistor TR1 by the low level of the light emitting current amplifying signal. At this time, if the input current of the input buffer BUF and the ON voltage of the transistor TR2 can be ignored, the collector output voltage (Vop) of the phototransistor PHTR is given by the following equation (6):

$$Vop \approx E - (R2 \times R2p)/(R2 + R2p) \times Iop = E - R2/Kg \times Iop \quad (6)$$

That is, the gain reduces to 1/Kg where $Kg=(R2+R2p)/R2p$.

When the paper sheet is not supplied and the external light does not enter, the pulsed light emitted from the light emitting diode PHD is reflected by the platen and then only a small amount of light arrives at the phototransistor PHTR. If the reflectance of the platen is Krb, then the output current (Iobp) in this case is given by following equation (7):

$$Iobp = (Kd \times Krb) \times Ifp \quad (7)$$

And according to the equation (6), the output voltage (Vohp) is given by the following equation (8):

$$Vohp \approx E - R2/Kg \times Iobp \quad (8)$$

When the paper sheet is not supplied and the external light enters, output current (In) which is based on the external light is added to equation (7). Therefore, according to the equation (5), the output current (Iobpn) is given by the following equation (9):

$$Iobpn = Iobp + In \quad (9)$$

According to equation (6), the output voltage (Vohpn) then is defined by the following equation (10):

$$Vohpn \approx E - R2/Kg \times Iobpn \quad (10)$$

When the paper sheet is supplied and the external light does not enter, the pulsed light emitted by the light emitting diode PHD is reflected from the paper and most of light arrives at the phototransistor PHTR. At this time, according to the equation (5), the output current (Iowp) is given by the following equation (11):

$$Iowp = (Kd \times Krw) \times Ifp \quad (11)$$

Moreover, according to equation (6), the output voltage (Volp) is given by the following equation (12):

$$Volp \approx E - R2/Kg \times Iowp \quad (12)$$

The relationship between the output current (Iobp) and the output current (Iowp) is $Iobp < Iowp$ on the basis of the difference in reflectance between the print paper (Kw) and the platen (Kb). The supply voltage (+E), the load resistances R2, R2p, and the resistances R1, R1p which limits to pulse current (Ifp) are preset so that the relationship between the threshold voltage (Vth) of the input buffer BUF and output voltage of the photoreflector 45 is $Vohp > Vohpn > Vth > Volp$. Therefore, the output voltage from the photoreflector 45 is changed to the logical level by the input buffer BUF and the output signal from the input buffer BUF is, without regard to the incidence of external light, a "0" level when the paper is supplied or a "1" level when paper is not supplied.

The output signal from the input buffer BUF is supplied to the common controller 3 as the print paper detecting signal. CPU 5 of the common controller 3 detects the existence of the paper by sampling the print paper detecting signal at the rising edge of the low level of the light emitting current amplifying signal, and controls the paper alarm LED, the printing operation and the paper end monitor according to the detected result.

The threshold value (Vth) of the input buffer BUF is decided according to the sensitivity of the photoreflector 45 as detected in a test mode, and is stored in the EEPROM 9 beforehand.

Figure 3:
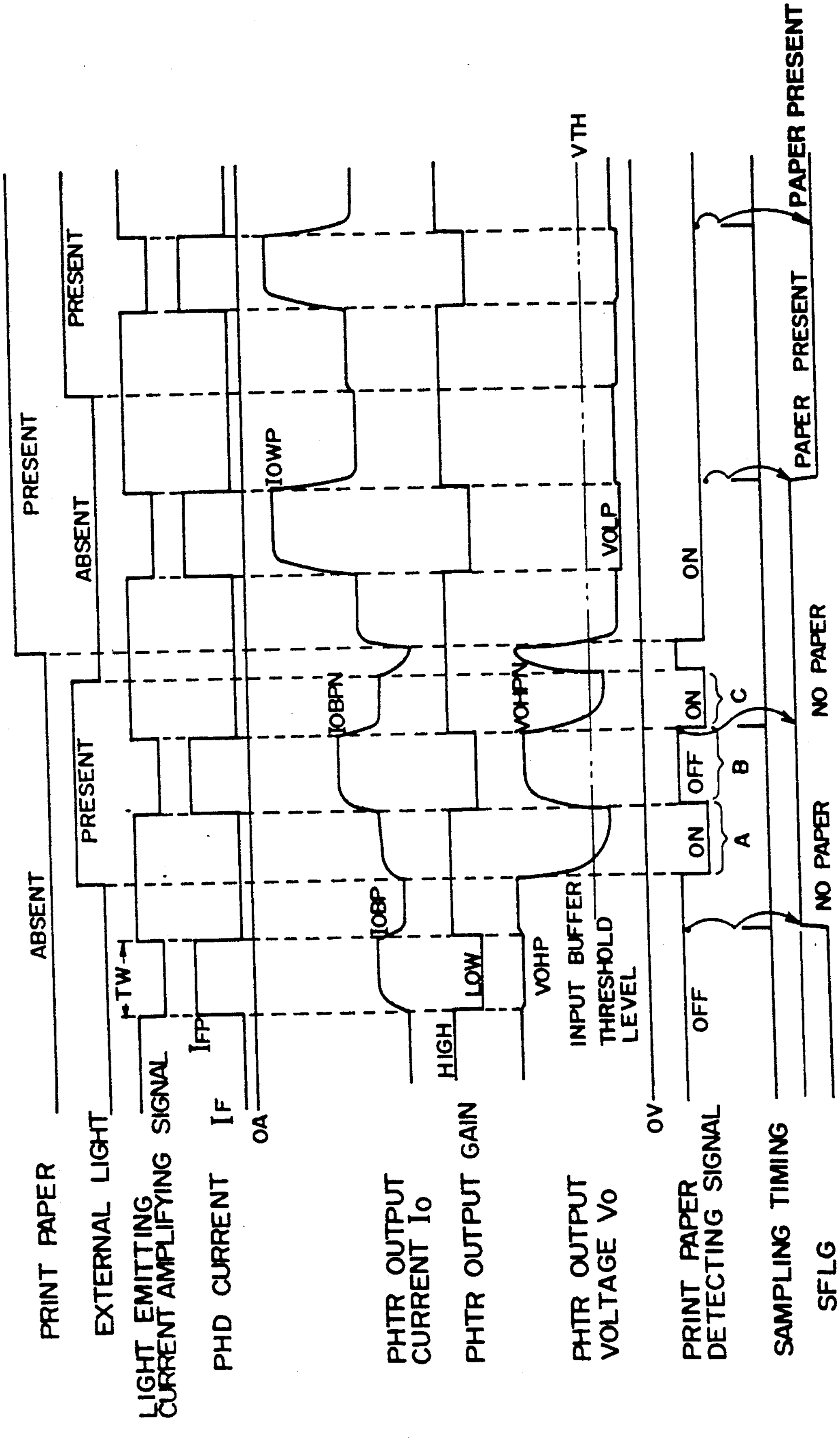
FIG. 3 is a timing chart for explaining the operation of the print paper detecting circuit illustrated in FIG. 1.

In the timing diagram as shown in FIG. 3, when the paper sheet is not supplied and the external light enters and when the constant current flows to the light emitting diode PHD, a paper detecting signal which indicates the presence of the paper sheet is accidentally output by the effect of the external light as shown in portion A. However, when a pulse current which is greater than the constant current flows to the light emitting diode PHD and the output gain of the phototransistor PHTR is lower than the steady gain, a paper detecting signal which shows the absence of the paper is correctly output as shown in portion B.

Figure 4A:
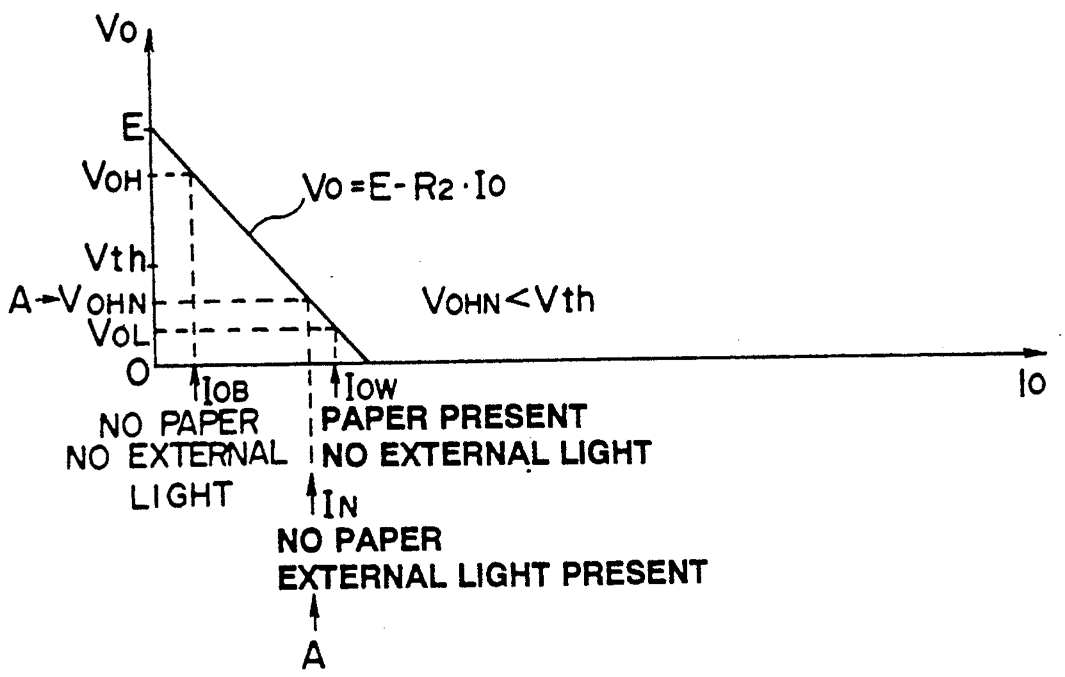
FIGS. 4A and 4B are graphs illustrating the output current-voltage characteristic of the optical sensor according to the present invention under different lighting conditions.
Figure 4B:
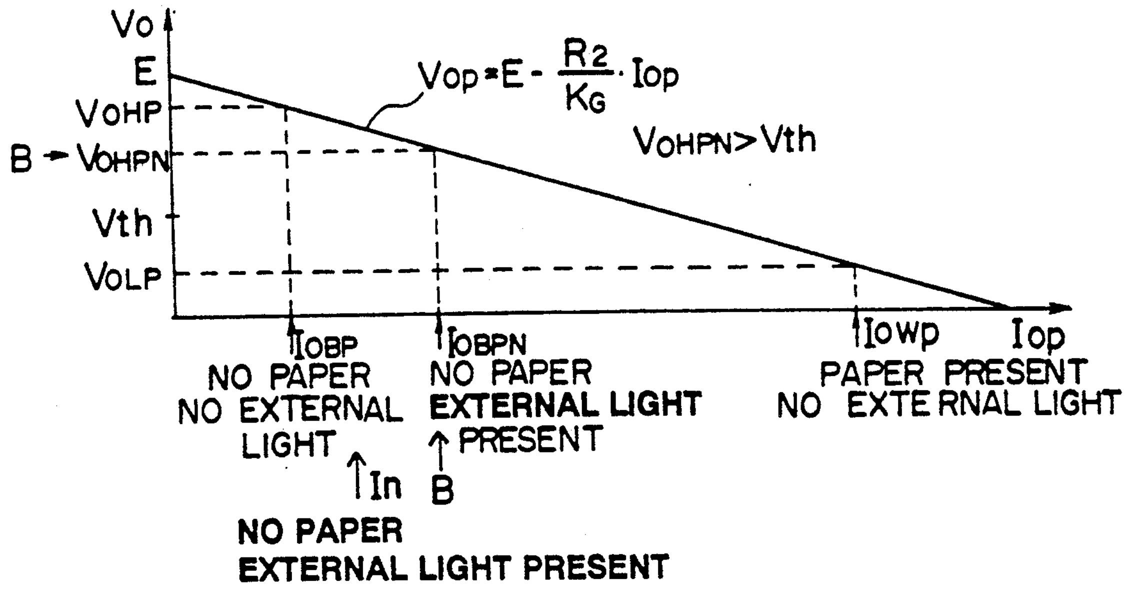

FIG. 4A and FIG. 4B correspond to portion A and portion B, respectively, of FIG. 3 and illustrate the output current −voltage characteristic of the optical sensor with the usual (steady state) light output and with the pulsed light output, respectively, of the light emitting diode PHD.

Figure 5:
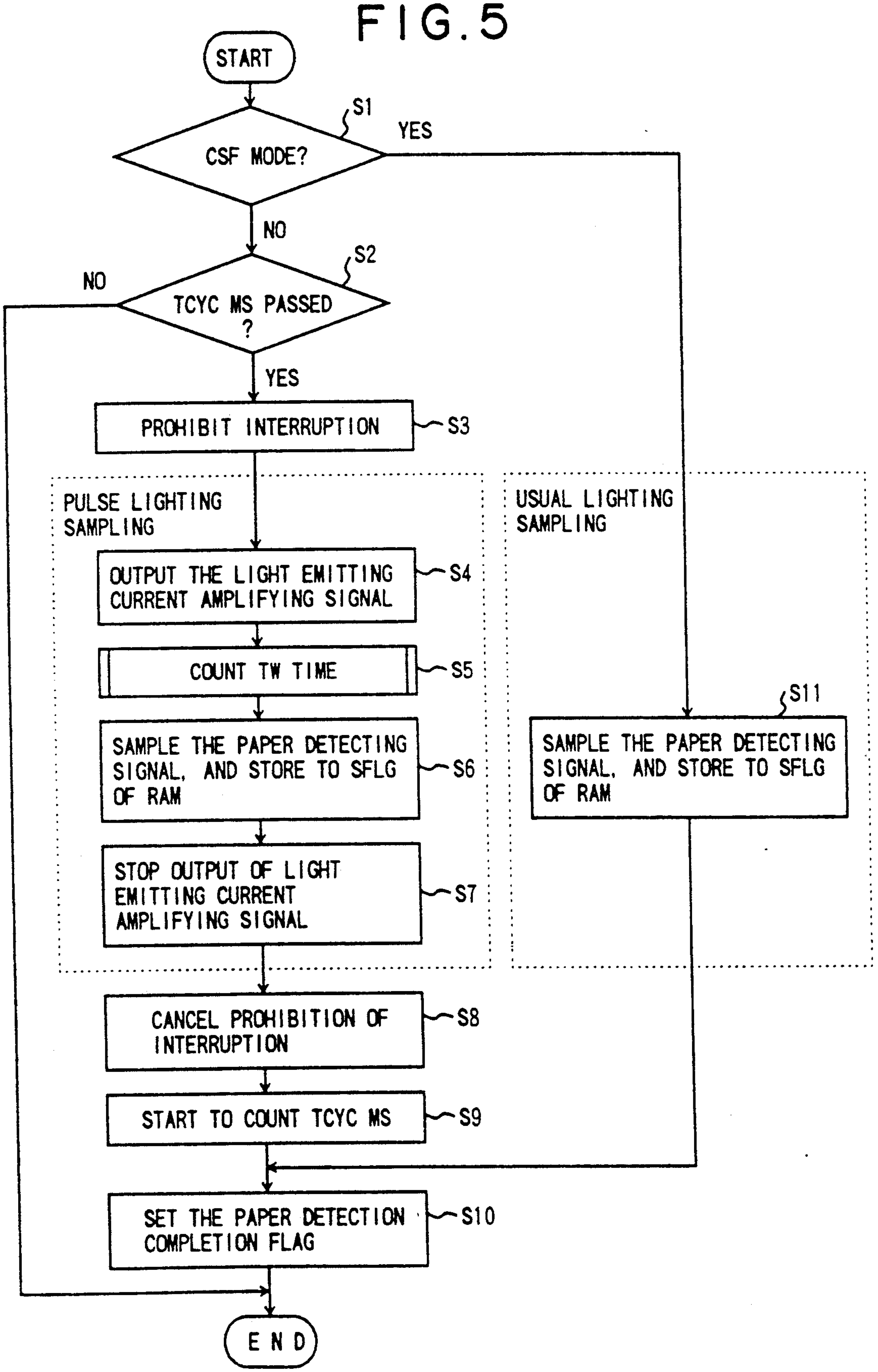
FIG. 5 is a flow diagram for explaining the paper detecting procedure of the print paper detecting circuit illustrated in FIG. 1.

FIG. 5 is a flow diagram illustrating the procedure which is controlled by CPU 5 of the common controller 3 for detecting whether the paper sheet is supplied.

CPU 5 decides initially whether the CSF mode is set according to a signal from the CSF control circuit (step S1). When the CSF mode is not set, CPU 5 decides that the mode for inserting the paper by hand is set, and then CPU 5 effects the pulse lighting since in this mode it is possible for external light to enter the printer and reach the phototransistor PHTR. It is necessary that the pulse lighting be a short pulse, have a high-precision, and have a long cycle such as tw=100 μsec±1 μsec and tcyc≦100 msec, so that the pulse lighting time (tw) and a pulse- recurrence cycle (tcyc) do not affect the life time of the light emitting diode PHD.

Therefore, when CPU 5 decides that the CSF mode is not set in step S1, CPU 5 monitors the pulse-recurrence cycle by using timer (TM) 6 to determine whether a time of more than tcyc msec passes after the last light pulse (step S2). When such a time passes, CPU 5 prohibits an interruption of the timer (step S3) and initiates a control to output the low level of the light emitting current amplifying signal (step S4) to effect a light pulse from the light emitting diode PHD, and simultaneously reduces the gain of the output voltage of the phototransistor PHTR. During this time the CPU 5 monitors the timer (TM) 6 and after detecting that tw time has passed (step S5), initiates a control to sample the print paper detecting signal and to store the sampled result in a SFLG register of RAM 8 (step S6). Thereafter the CPU 5 initiates a control to stop the outputting of the light emitting current amplifying signal (step S7). Furthermore, CPU 5 cancels the prohibition of the interruption (step S8), starts the (TM) 6 timer for monitoring the pulse-recurrence cycle timer (step S9), and sets a paper detection completion flag (step S10).

The data receiving procedure is suspended during the prohibition of the interruption, since it is difficult to efficiently effect the data receiving procedure from the superior equipment or system and to simultaneously effect a timer interruption procedure which requires accurate time. The manual mode for inserting the paper, however, does not have this problem since that mode is concerned with processing which does not require an accurate time restriction.

In the CSF mode, CPU 5 needs to parallel effect the paper detecting procedure, the timer interruption procedure for changing the phase of the stepping motor for line feed, and the data receiving procedure from the superior system equipment. If the paper detecting procedure as shown in step S2 - S9 is effected in the CSF mode, it would be necessary to actuate the stepping motor with a low speed in order to avoid step-out of the stepping motor if a time error (tw) occurs upon changing of the phase of the stepping motor, and thus reduce the through-put of print. Although it is possible to avoid this problem by an additional hardware timer for generating the pulse lighting time of the light emitting diode PHD, such, however, increases the cost of the hardware.

Therefore, in the present invention, CPU 5 provides a control wherein in the CSF mode the pulse lighting is changed to the usual lighting in consideration of the obstruction of external light by the cut sheet feeder (CSF) installed on the printer. In this mode CPU 5 causes the normal print paper detecting signal to be sampled and the sampled result to be stored in the SFLG register of RAM 8 (step S11).

As set forth hereinabove, in the paper detecting circuit 4 as described in the first embodiment, when the pulse current, which is greater than the usual constant current, flows to the light emitting diode PHD, the gain of the output voltage of the phototransistor PHTR is reduced simultaneously. Therefore, the circuit 4 is able to avoid detecting a paper sheet accidentally in response to the external light since the quantity of the light which is emitted from the light emitting diode PHD and which is reflected from the paper is greater than the quantity of the external light.

Figure 6:
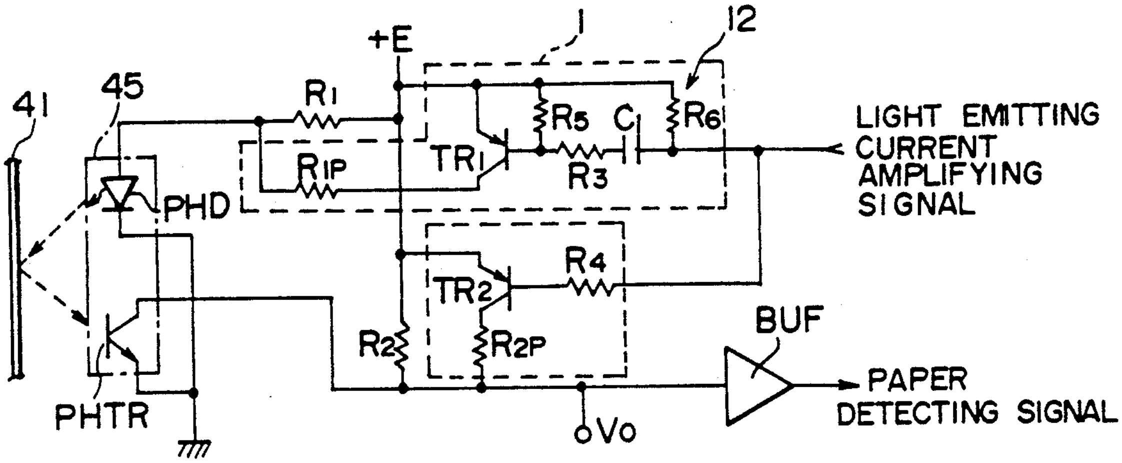
FIG. 6 is a circuit diagram illustrating a second embodiment of a print paper detecting circuit according to the present invention.

FIG. 6 is a circuit diagram illustrating a second embodiment of a print paper detecting circuit according to the present invention. In FIG. 6, the same or like parts of FIG. 1 illustrating the first embodiment are denoted by the same reference characters.

In this embodiment, a time limit circuit 12 is added to the light emitting current amplifier 1 of the print paper detecting circuit of FIG. 1. The time limit circuit 12 has a capacitor C1 serially connected to the input resistance R3, a resistance R connected between the emitter and the base of the transistor TR1, and a resistance R6 parallel connected to the series circuit consisting of the resistances R3 and R5 and the capacitor C1.

The operation of the second embodiment is explained with reference to timing diagram shown in FIG. 7.

Figure 7:
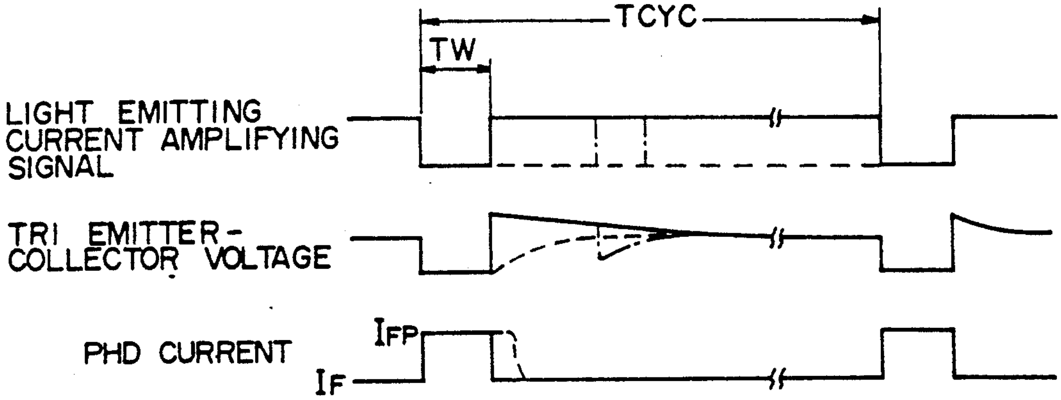
FIG. 7 is a timing diagram for explaining the operation of the print paper detecting circuit illustrated in FIG. 6.

As shown in full line of FIG. 7, the light emitting current amplifying signal outputted from the common controller 3 is controlled by CPU 5 to have a short pulse length and long cycle time such as tw=100 μsec+1 μsec and tcyc<100 so that the pulse lighting time (tw) and the pulse-recurrence cycle (tcyc) do not affect the life time of the light emitting diode PHD. When the low level of the light emitting current amplifying signal is generated, a charging current flows to the capacitor Cl through the path capacitor C1, the resistances R3, R5 and the supply voltage (+E), the volt age between the emitter and the base of the transistor TR1 becomes greater than 0.7 V, the transistor TR1 is turned ON and the pulse current (Ifp) flows to the light emitting diode PHD. The charge of the capacitor C1 discharges through the resistance R3, R5 and R6 according to the extinction of the light emitting current amplifying signal.

When the light emitting current amplifying signal stays at a low level after a time greater than tw as shown in dashed line of FIG. 7 due to a malfunction of CPU 5 because of electrical noise entering into the AC power source of the printer, the capacitor C1 is charged up according to a charging current flowing along the path of the capacitor C1, the resistance R3, the base-emitter and path of the transistor TR1, and the supply voltage (+E). When this charging current becomes small, the voltage between the emitter and the base of transistor TRI becomes small, the transistor TR1 is turned OFF and the pulse current of the light emitting diode PHD returns to the constant current. Therefore, the light emitting diode PHD is not damaged.

When the light emitting current amplifying signal becomes low level during the pulse-recurrence duration as shown in dot-dashed line of FIG. 7, the charging current of the capacitor C1 is small and the transistor TR1 stays OFF since the charge of the capacitor C1 does not discharge sufficiently. Therefore, the pulse current does not flow to the light emitting diode PHD, and thus it does not affect to the life time of the light emitting diode PHD.

As set forth in the second embodiment, even if the light emitting current amplifying signal is accidentally generated for a long time because of noise which entered the AC power source, the light emitting diode PHD is not damaged due to the time limit circuit which was added to the print paper detecting circuit.

Figure 8:
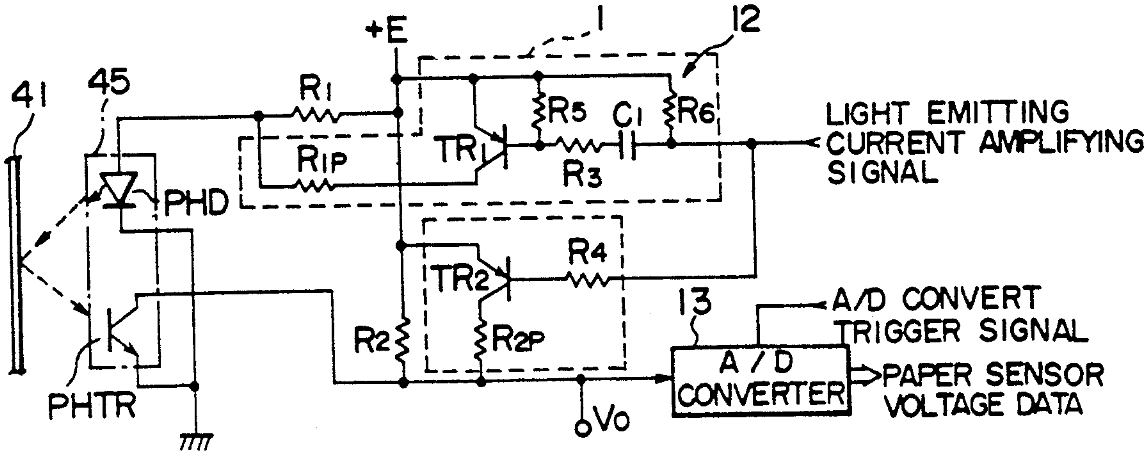
FIG. 8 is a circuit diagram illustrating a third embodiment of a print paper detecting circuit according to the present invention.

FIG. 8 is a circuit, diagram illustrating a third embodiment of a print paper detecting circuit according to the present invention. In FIG. 8, the same or like parts of FIG. 6 are denoted by the same reference characters.

In this embodiment, A/D converter 13 substitutes for the input buffer BUF of the circuit shown in FIG. 6. A/D converter 13 converts the output voltage from the phototransistor PHTR to a digital value in response to a A/D convert trigger signal, and sends the digital value to the common controller 3 as paper sensor voltage data. The common controller 3 compares the paper sensor voltage data with the proper threshold value for each mode, and detects whether the paper has been supplied.

Figure 9:
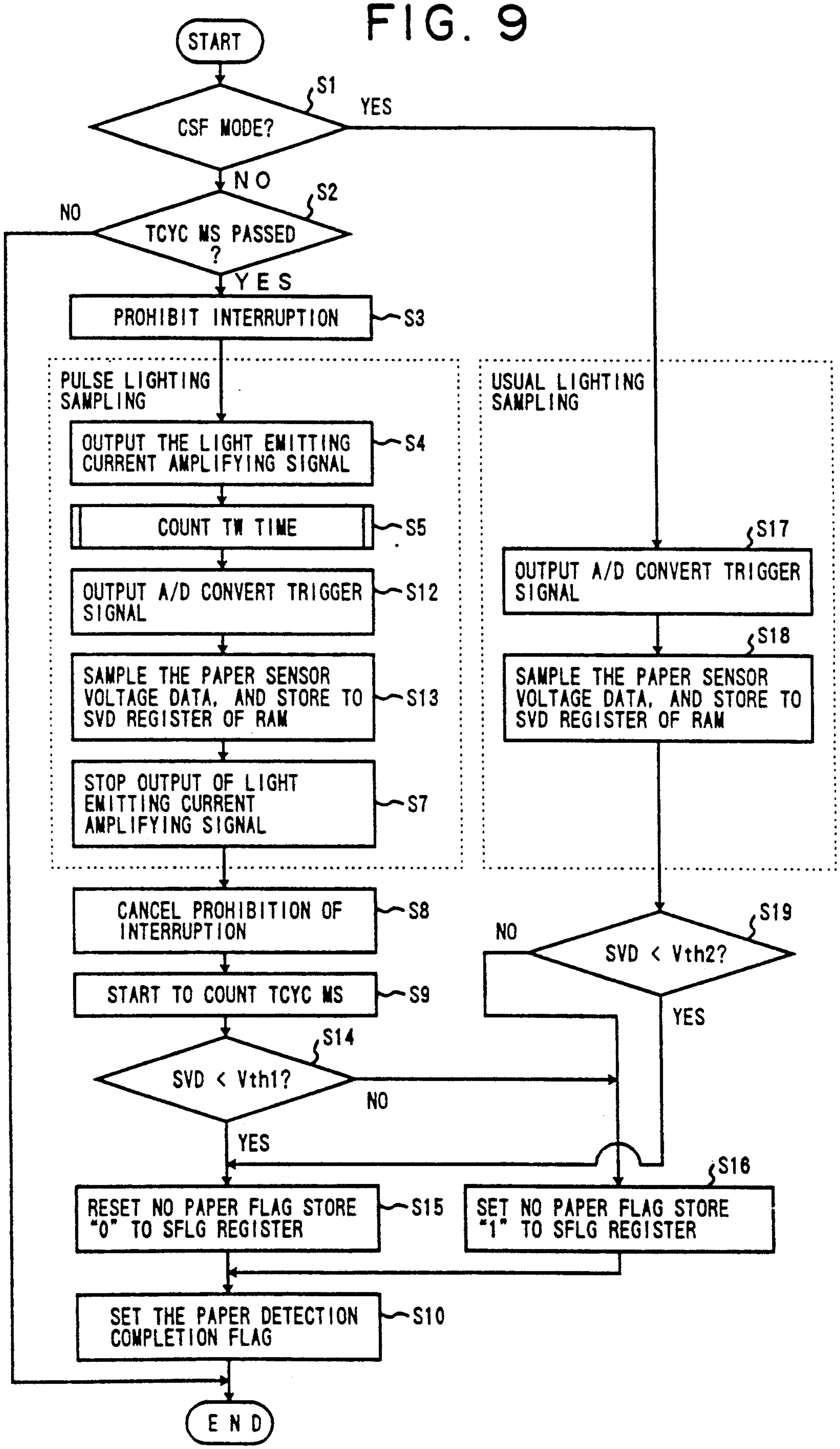
FIG. 9 is a flow diagram for explaining the operation of the print paper detecting circuit illustrated in FIG. 8.

The operation of the paper detecting circuit of the third embodiment of FIG. 8 is explained by the flow chart as shown in FIG. 9.

CPU 5 decides whether the CSF mode is set (step S1). When the CSF mode is not set, CPU 5 monitors the pulse-recurrence cycle by the timer (TM)6 to determine whether a time period of more than tcyc msec has passed after the last light pulse (step S2). When this time has passed, CPU 5 prohibits the interruption (step S3) and causes the low level of the light emitting current amplifying signal to be output and fed to the current amplifier to effect the pulsed light of the light emitting diode PHD and to the gain reducing circuit 2 to reduce the gain of the output voltage of the phototransistor PHTR (step S4). Furthermore, during this time CPU 5 monitors the timer 6. After detecting that time tw has passed (step S5), CPU 5 outputs the A/D convert trigger signal (step S12), samples the paper sensor voltage data, and stores the sampled result in SVD register of RAM 8 (step 13). After that, CPU 5 stops the outputting of the light emitting current amplifying signal (step S7).

Furthermore, CPU 5 cancels the prohibition of the interruption (step S8), starts to count the pulse-recurrence cycle using timer 6 (step S9) and compares the paper sensor voltage data (SVD) with a threshold value Vth1 which is stored in ROM 7 (step S14). When the compared result is SVD<Vth1, CPU 5 resets a no paper flag SFLG (step S15). When SVD≧Vth1, CPU 5 sets the no paper flag SFLG (step S16). After that, CPU 5 sets the paper detection completion flag (step S10).

When CPU 5 decides that the CSF mode is set, CPU 5 causes the A/D convert trigger signal to be generated (step S17), samples the paper sensor voltage data and then stores the sampled result in the SVD register of RAM 8 (step S18), and compares the paper sensor voltage data (SVD) with a threshold value Vth2 for the CSF mode which is likewise stored in ROM 7 (step 19). When SVD<Vth2, CPU 5 resets the no paper flag SFLG (step S15). When SVD≧Vth2, CPU 5 sets the no paper flag SFLG (step S16). After that, CPU 5 sets the paper detection completion flag (step S10).

According to the third embodiment, the output voltage is converted to a digital value and is compared with the respective threshold value for each mode. Therefore, the circuit is able to detect the existence of the paper without regard to differences in the sensitivity of the sensor, differences in the reflectance on the basis of the paper type and so on.

Figure 10:
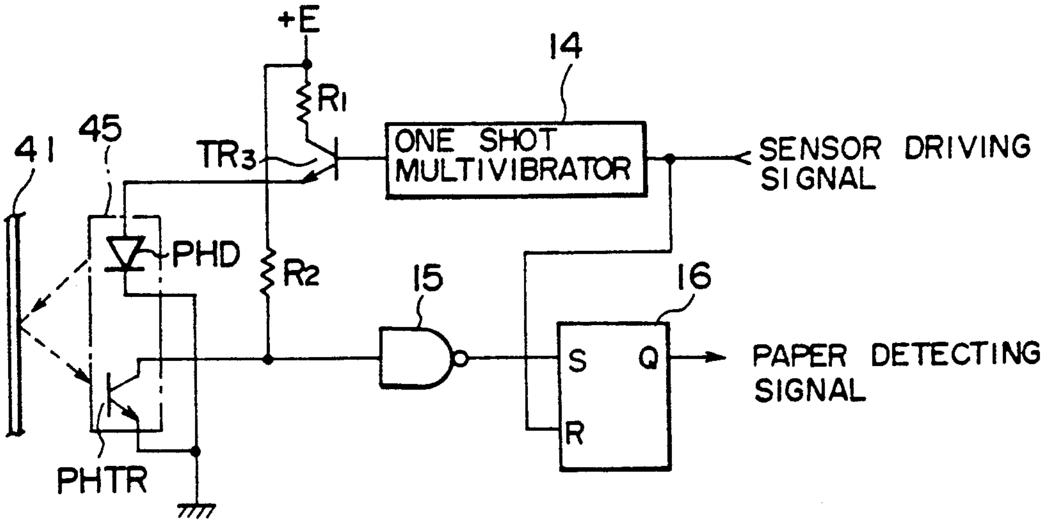
FIG. 10 is a circuit diagram illustrating a fourth embodiment of a print paper detecting circuit according to the present invention.

FIG. 10 is a circuit block diagram illustrating a fourth embodiment of a print paper detecting circuit. In FIG. 10, the same or like parts of FIG. 1 are denoted by the same reference characters.

In FIG. 10, a transistor TR3 for driving the optical sensor has its collector-emitter path connected between the current limit resistance R1 and the anode of the light emitting diode PHD and its base connected to the output of a one shot multivibrator 14. When the one shot multivibrator 14 is actuated or triggered according to a high level of the sensor driving signal, the transistor TR3 is turned ON for a predetermined time period, and current flows to the light emitting diode PHD to produce a light pulse.

The output voltage (Vo) from the phototransistor PHTR of photoreflector 45 is inverted in an invertor 15 and is fed to a set input (S) of a set-reset flip-flop circuit 16. The sensor driving signal is also fed to a reset input (R) of the set-reset flip-flop circuit 16, and the output (Q) of the set-reset flip-flop circuit 16 provides the paper detecting signal.

The operation of the fourth embodiment of FIG. 10 is explained with reference to the timing diagrams of FIGS. 11A–11D.

Figure 11A:
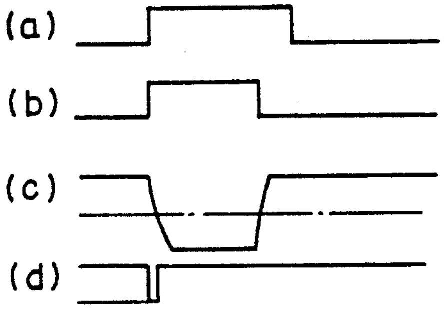
FIG. 11A–11B, 11C, and 11D are timing diagrams for explaining the operation of the print paper detecting circuit illustrated in FIG. 10.
Figure 11B:
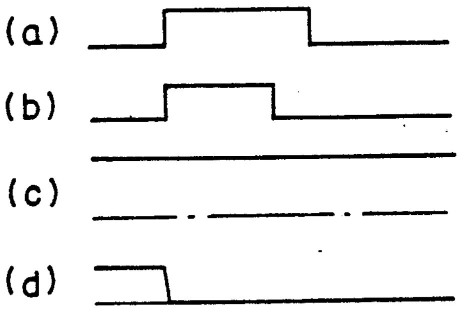
Figure 11C:
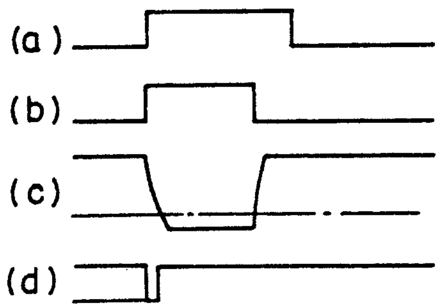
Figure 11D:
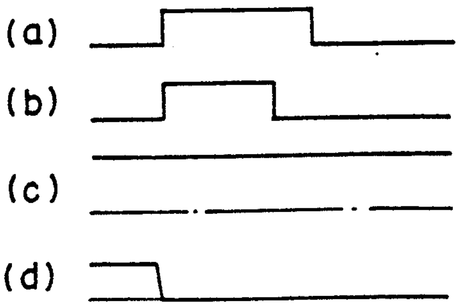

FIG. 11A illustrates a timing diagram illustrating the condition that external light enters the printer and the paper is present and detected. FIG. 11B is a timing diagram illustrating the condition that external light enters the printer and the paper does not exist, i.e., is absent. FIG. 11C is a timing diagram for the condition that the external light does not enter the printer and the paper is present. FIG. 11D is a timing diagram for the condition that the external light does not enter and the paper is not present.

In each figure, (a) shows the waveform of the sensor driving signal, (b) shows the output waveform of the one shot multivibrator 14, (c) shows the output waveform of the photoreflector 45, that is the output from the collector of the phototransistor PHTR, and (d) shows the waveform of the paper detecting signal. Furthermore, the dot-dash line shown for waveform (c) in each figure shows the threshold value (Vth) of the invertor 15.

For the condition that the external light enters and the paper is present as shown in FIG. 11A, when the high level of the sensor driving signal (a) is impressed, the output waveform (b) from the one shot multivibrator 14 becomes high level for the predetermined time period, the set-reset flip-flop circuit 16 is reset simultaneously, and then the output waveform of the paper detecting signal (d) becomes low level. The output waveform (c) from the photoreflector 45 is normally at some level caused by the entering external light. Consequently, the value of the load resistance R2 is determined so that the output level from the photoreflector 45 is higher than the threshold value (Vth).

The transistor TR3 for driving the sensor is turned ON during the time that the output waveform (b) from the one shot multivibrator 14 is high level, and then the light emitting diode PHD is driven. Furthermore, the light emitted from the light emitting diode PHD is reflected from the surface of the paper and arrives at the phototransistor PHTR. As a result, the output waveform (c) from the photoreflector 45 drops to a lower level than the threshold value (Vth), and then the set-reset flip-flop circuit 16 is set and the waveform (d) of the paper detecting signal becomes high level.

For the condition that the external light enters and the paper is not present as shown in FIG. 11B, the output waveform (c) from the photoreflector 45 is normally at some level caused by the external light. The waveform (d) of the paper detecting signal, however, keeps a low level since there is no reflected light from the paper during pulsing of the light emitting diode PHD.

For the condition that the external light does not enter and the paper is present as shown in FIG. 11C, the output waveform (c) from the photoreflector 45 is at a high level normally since no external light enters. When the high level of the sensor driving signal (a) is impressed, the waveform (d) of the paper detecting signal becomes high level according to the same procedure as shown in FIG. 11A.

For the condition that the external light does not enter and the paper is not present as shown in FIG. 11D, the output waveform (c) from the photoreflector 45 is at a high level normally, and it keeps this high level during the light emitting time of the light emitting diode PHD because of no reflected light from the paper. Therefore, the waveform (d) of the paper detecting signal keeps a low level.

As regards the waveform (a) of the sensor driving signal, it is necessary to space two successive drive signals so that the mean value of the current which flows to the light emitting diode PHD satisfies the continuous rating of the diode.

With the fourth embodiment of FIG. 10, it is possible to control the time that current flows to the light emitting diode so that it is able to emit high energy light for a short period of time. Therefore, it is possible to avoid a malfunction which is based on the external light without affecting the life time of the light emitting diode PHD.

Figure 12:
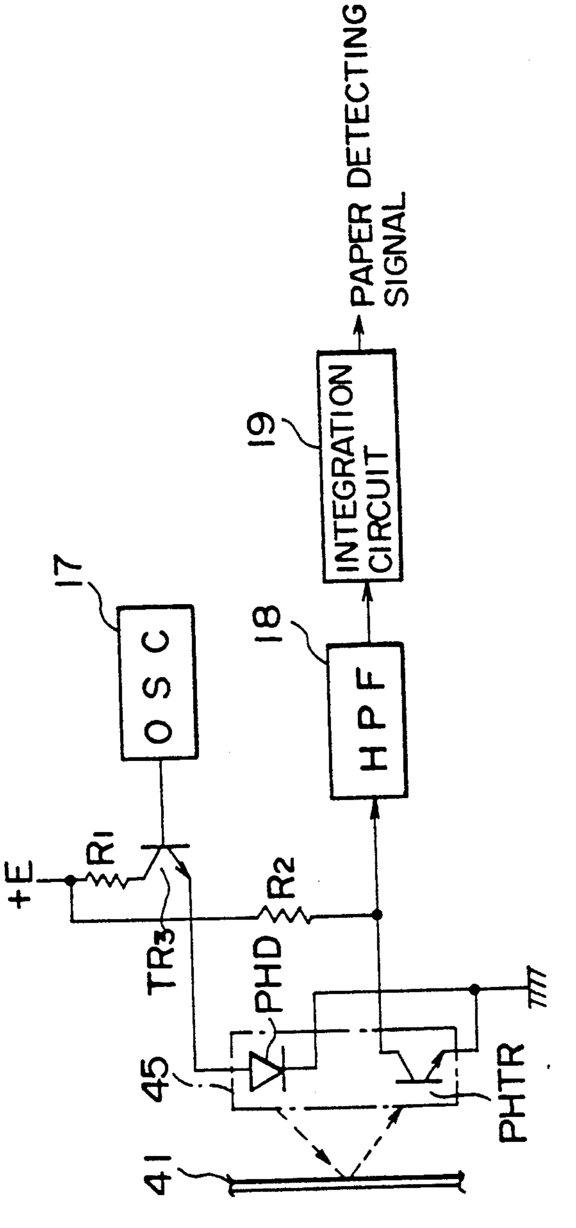
FIG. 12 is a circuit diagram illustrating a fifth embodiment of a print paper detecting circuit according to the present invention.

FIG. 12 is a circuit diagram illustrating a fifth embodiment of a print paper detecting circuit according to the present invention. In FIG. 12, the same or like parts of FIG. 10 are denoted by the same reference characters.

In this figure, the transistor TR3 for driving the sensor is turned ON or OFF by the output of a oscillator circuit (OSC) 17 connected to its base, and supplies current pulses to the light emitting diode PHD of the photoreflector 45 via the current limit resistance R1. The light emitting diode PHD consequently produces light flashing at the same frequency as the oscillator circuit (OSC) 17. When the paper is present, the reflected light from the paper arrives at the phototransistor PHTR and then the phototransistor PHTR generates the light current. The light current is connected to a voltage by the load resistance R2 and is fed to a high-pass filter (HPF) 18.

The voltage which is fed to the high-pass filter (HPF) 18 is in proportion to the light current which is added on the basis of the external light to the light current added on the basis of the reflected light. The high-pass filter (HPF) 18 is designed to have a cut-off frequency intermediate the oscillation frequency of the oscillator circuit (OSC) 17 and a commercial frequency (50 Hz or 60 Hz). Therefore, only signals corresponding to the reflected light which is reflected from the paper ar output by the high-pass filter (HPF) 18, and are supplied to an integration circuit 19. The integration circuit 19 converts the alternating current which is output by the high-pass filter (HPF) 18 to a direct current, and outputs a predetermined level of the output voltage, which is determined by the duty cycle of the alternating current, as the paper detecting signal. When the output signal from the high-pass filter (HPF) 18 is zero volts (OV) or a direct current, the integration circuit 19 outputs 0 volts.

When the oscillation frequency of the oscillator circuit (OSC) 17 is a square wave which has a 50 percent duty cycle of 1 KHz and when the cut-off frequency of the high-pass filter (HPF) 18 is 500 Hz, the high-pass filter (HPF) 18 outputs the signal from the oscillator circuit (OSC) 17 and blocks the signal of the commercial frequency band such as 50 Hz or 60 Hz.

The operation of the paper detecting circuit of the fifth embodiment of FIG. 12 is explained with reference to the timing diagram shown in FIG. 13.

Figure 13:
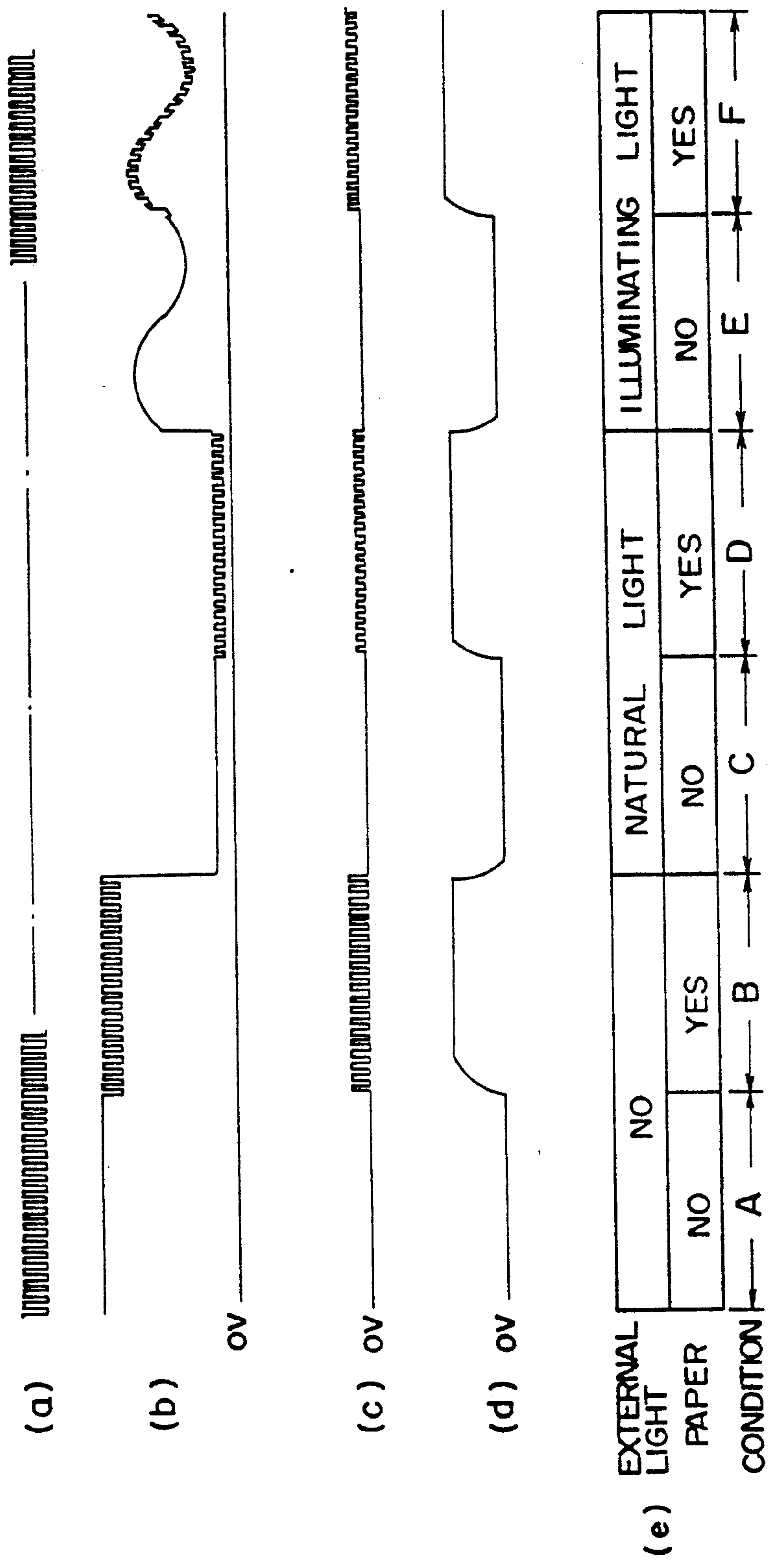
FIG. 13 is a timing diagram for explaining the operation of the print paper detecting circuit illustrated in FIG. 12.

In FIG. 13, (a) shows the output from the oscillator circuit (OSC) 17, (b) shows the input to the high-pass filter (HPF) 18, (c) shows the output from the high-pass filter (HPF) 18, (d) shows the waveform of the paper detecting signal and (e) shows the transition relative to the condition of the external light and the paper. Furthermore, in this embodiment, the conditions as shown in (e) are defined as follows: in condition A the external light does not enter and the paper is not present; in condition B the external light does not enter and the paper is present; in condition C natural light enters and the paper is not present; in condition D natural light enters and the paper is present; in condition E illuminating light enters and the paper is not present; and in condition F illuminating light enters and the paper is present.

In condition A, the input waveform (b) to the high-pass filter (HPF) 18 is at 0 v and the waveform (d) of the paper detecting signal is likewise 0 v since no external light enters and there is no reflected light since the paper is not present.

In condition B, the input waveform (b) to the high-pass filter (HPF) 18 is in proportion to the output waveform (a) from the oscillator circuit (OSC) 17. This input waveform (b) passes through the high-pass filter (HPF) 18 and is integrated by the integration circuit 19, and then it is output as the waveform (d) of the predetermined level of the paper detecting signal.

For conditions C and D, the input waveform (b) is biased by the external light, but the direct current on the basis of the external light is stopped by the high-pass filter (HPF) 18. Therefore, as regards the output waveform (c) and the waveform (d) of the paper detecting signal, condition C is same as condition A and condition D is same as condition B.

For condition E, the input waveform (b) presents a sine wave because of the external illuminating light, but it is blocked or filtered out by the high-pass filter (HPF) 18. Therefore, both waveform (c) and (d) become 0 v.

For condition F, the input waveform (b) presents a waveform in which a sine wave is added to the square wave of the output waveform (a) from the oscillator circuit (OSC) 17, but this sine wave is filtered out by the high-pass filter (HPF) 18. Therefore, the output waveform (c) is in proportion to the output waveform (a)

from the oscillator circuit (OSC) 17, and the waveform (d) of the paper detecting signal for this condition is the same as the waveform (d) of conditions B and D.

Although the frequency discriminating function is effected by the high-pass filter (HPF) 18 and the integration circuit 19, it is able to use the well-known discriminator which is used in the modulator or the demodulator.

Although each embodiment has been explained with regard to a printer in which the paper is supplied by hand or by a cut sheet feeder, the invention is not limited. Accordingly, it is applicable to the detection for paper supplied from various paper feed paths, such as a continuous print paper supplied from a pin tractor mechanism.

The invention now being fully described, it will be apparent to one of ordinary skill in the art that any changes and modifications can be made thereto without departing from the spirit or scope of the invention as set forth herein.

What is claimed is:

1. A print paper detecting circuit for detecting the presence of a print paper at a desired position along a paper feedpath, said circuit comprising:

an optical sensor disposed at the desired position and having a light emitting diode for emitting light and a phototransistor for receiving the light and producing an output voltage corresponding to the received light;

a current supply circuit for normally supplying a constant current to said light emitting diode;

a current amplifying means, responsive to a control pulse and connected to said current supply circuit, for supplying a current pulse to amplify the current supplied to said light emitting diode;

a gain reducing circuit means, responsive to said control pulse, for reducing the gain of the output voltage from said phototransistor to less than a normal steady state gain during the time the current pulse is supplied; and an output circuit means, responsive to the output voltage of said phototransistor, for providing an output signal indicating the presence of a print paper at the desired position.

2. A print paper detecting circuit as defined in claim 1 wherein: said current supply circuit comprises a series circuit of a limit resistor and said light-emitting diode connected across a voltage source; and said current amplifying means comprises a transistor having its base connected via an input resistor to an input line for said control pulse, and its emitter-collector path connected in a further series circuit with a further limit resistor, and with said further series circuit connected in parallel with said first limit resistor.

3. A print paper detection circuit as defined in claim 2 wherein: said phototransistor has its emitter-collector path connected in series with a load resistor across said voltage source; and said gain reducing circuit means comprises a further transistor having its base connected via a further input resistor to said input line for said control pulse, and its emitter-collector path connected via a further resistor in parallel with said load resistor.

4. A print paper detection circuit as claimed in claim 2, wherein said current amplifying circuit means includes a time limit circuit for limiting the maximum length of time the current pulse is supplied to said light emitting diode, said time limit circuit including a capacitor connected in series with said input resistor and a pair of series connected resistors connected in parallel with said series connection of said capacitor and said input resistor, and having its common connection of said pair of resistors connected to said voltage source.

5. A paper detecting circuit as defined in claim 1, wherein said current amplifying circuit means includes a time limit circuit for limiting the maximum length of time the current pulse is supplied to said light emitting diode.

6. A print paper detecting circuit as claimed in claim 1, wherein said output circuit includes a buffer means, responsive to the output voltage from said phototransistor, for producing a first logic level output signal when a paper is detected and a second logic level output signal when no paper is detected.

7. A print paper detecting circuit as claimed in claim 6, further comprising a controller means for producing said control pulse and for sampling the output signal from said buffer at a rising edge of said control pulse to determine the presence of the paper at the said position.

8. A print paper detecting circuit as claimed in claim 1, further comprising controller means for controlling the length of said control pulses and the timing cycle between adjacent ones of said control pulses.

9. A print paper detecting circuit as claimed in claim 1, wherein said output circuit means includes an A/D converter for converting the output voltage from said phototransistor to a corresponding digital value.

10. A print paper detecting circuit as claimed in claim 9, further comprising a controller circuit means for comparing said digital value with a predetermined threshold value to determine the presence of the paper.

11. A print paper detecting circuit as claimed in claim 10, wherein said controller circuit means outputs an A/D convert trigger signal to actuate said A/D converter in synchronism with said control pulses.

12. A print paper detecting circuit as claimed in claim 1, further comprising: a controller, responsive to a signal indicating that an automatic cut sheet feeder is installed to supply the print sheets for providing said control pulses only when said signal is not provided.

* * * * *